Jan. 16, 1968  J. W. BRAZELL II  3,363,919
SWIVEL JOINT CONNECTOR
Filed April 13, 1965
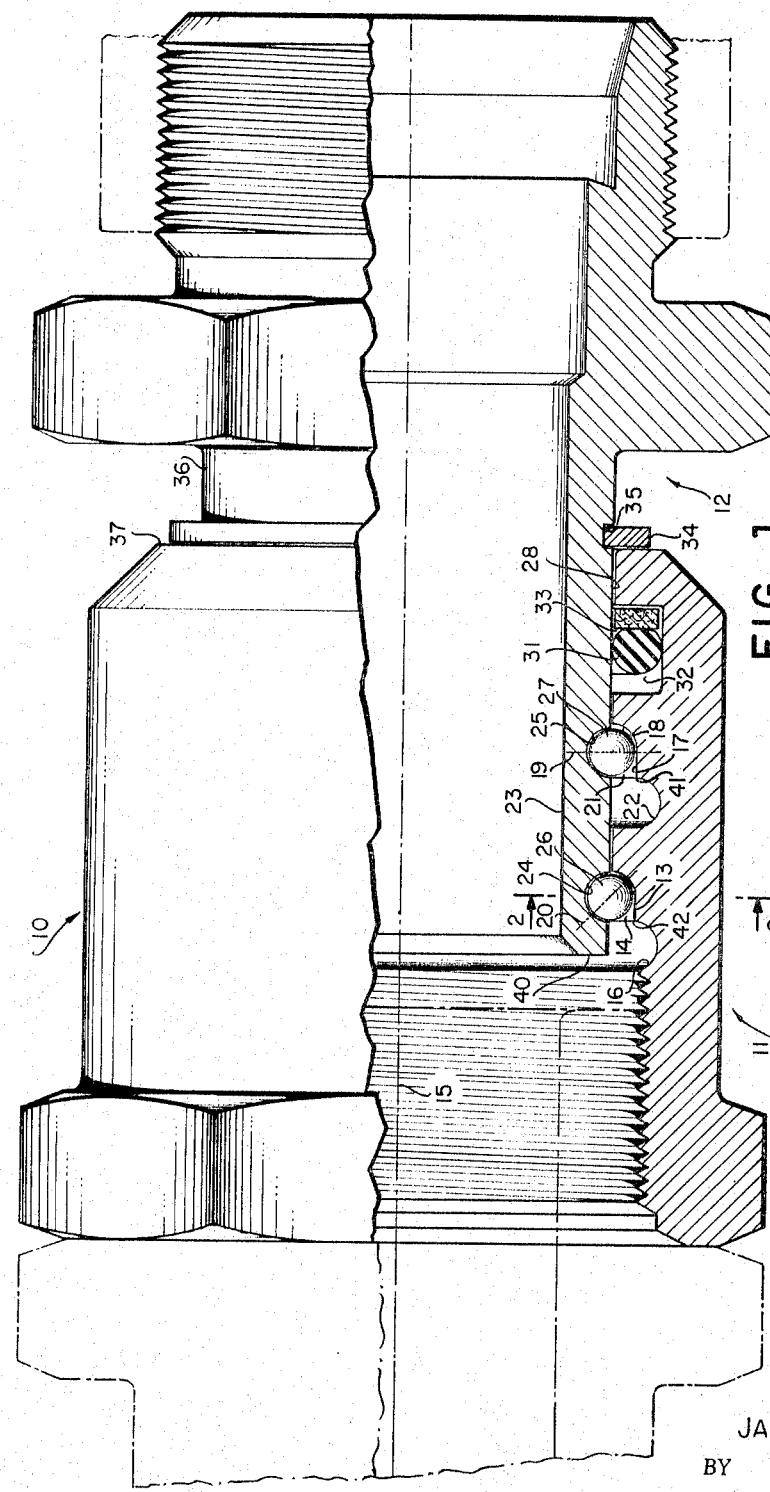
INVENTOR.
JAMES W. BRAZELL II.
BY
George C. Sullivan
Agent

3,363,919
SWIVEL JOINT CONNECTOR
James W. Brazell II, Atlanta, Ga., assignor to Lockheed Aircraft Corporation, Burbank, Calif.
Filed Apr. 13, 1965, Ser. No. 447,681
2 Claims. (Cl. 285—276)

ABSTRACT OF THE DISCLOSURE

A swivel connector having male and female members interfitting for continuous rotation realtive to one another where each member has a pair of ball bearing race recesses which are integral with their respective supporting member. The race recesses are complementary disposed with one another to provide a complete ball bearing race. The completed swivel connector is generally only a two-piece device plus the necessary ball bearings and there is provided a resilient seal to prevent leakage of fluid between the male and female members.

---

This application relates in general to tubing connectors and in particular to tubing connectors of the type wherein one portion of the connector is freely rotatable with respect to another portion of the connector.

In the design and fabrication of fluid systems of various types, it frequently becomes desirable to provide a fluid connection between two components which are movable relative to one another. This requirement often takes the need for a multi-component pipe connection wherein one component of the connection is freely rotatable or swivelable with respect to another component of the connection. An example of the need for such a connection may be found in the lines supplying hydraulic braking and/or steering pressure to the wheels of an aircraft landing gear. Since the landing gear in a modern aircraft typically may be folded at several points to permit complete retraction of the gear into the fuselage or other portion of the aircraft, it becomes important to provide suitable connections to permit hydraulic lines to be folded along with the structural portions of the landing gear without risk of leakage or other failure of this portion of the hyrdaulic system.

Swivel connections or other techniques have been proposed to permit rotary movement of a portion of a fluid system with respect to another portion thereof. For example, in a simple case wherein only small amounts of relative rotation are expected to be encountered, a satisfactory connection can be provided through the simple expedient of using a flexible coupling member such as a hose between the relatively movable portions of the system. One or more coils may be formed in the hose, as desired, to extend the flexibility of the connection. Such a connection, while simple and inexpensive in fabrication, does not provide the pressure capabilities or the reliability that are required in many applications. Repeated cycling of such a connection may cause weakening and failure of the hose due to repeated flexing of the fibers thereof. Furthermore, such a connection is, of course, not usable in a situation where a relatively great degree of rotation or continuous rotation of the conduit is required.

Tubing connectors of various types have been provided which dispense with the need for a flexible hose or similar member and which provide complete or 360° rotation. Such connectors frequently use one or more bearing members made up of a plurality of bearing balls inserted in the connector so as to be disposed between the fixed and movable portions thereof. Connectors using bearing balls, however, must be designed to permit insertion into the connector of the necessary bearing balls during the actual assembly of the connector. Moreover, the connector must be designed so that, once assembled, there is no likelihood that any of the bearing balls can become dislodged or removed from its normal path of travel so as to cause binding of or damage to the connector or to the conduit joined by the connector. To accomplish this, the connectors of the prior art frequently are designed with rings, plugs or other components designed to be attached to one of the connector portions to retain the balls therein after the bearing balls have been properly positioned within the connector.

While this expedient may permit loading the bearing balls into the connector and then relatively securely retaining the balls therein, it suffers from certain disadvantages. One of these is the need for additional parts or components for a connector that nominally has only two major mating portions. In addition to the cost of designing and producing such additional components, the cost of such a connector is further increased because of the necessity of additional machining operations thereon to permit insertion of the bearing balls and then attachment of the bearing ball retaining device. Furthermore, assembly of such a connector is complicated by the need to install a retaining device which frequently is relatively small and difficult to manipulate. Such construction also increases the weight of the connector, a critical factor in aerospace applications.

These problems of prior art swivel connectors are reduced or overcome according to the present invention, which provides a swivel connector permitting continuous swiveling or rotation and which comprises only two major components in addition to bearing balls, seals and the like. The components of this invention may be fabricated by means of relatively simple machining operations and without the need of machining operations that cannot be accomplished with a lathe or other turning device. Assembly of the components to provide a finished connector is quickly and easily accomplished.

Accordingly, an object of this invention is to provide an improved swivel connector.

Another object of this invention is to provide a swivel connector that is relatively inexpensive to fabricate and assemble.

A further object of this invention is to provide a swivel connector having relatively few components.

Still another object of this invention is to provide a swivel connector permitting ease of assembly.

Yet another object of this invention is to provide a swivel connector which may be assembled in combination with the associated bearing balls without the need for a separate bearing ball retaining member.

A still further object of this invention is to provide a swivel connector that is relatively light of weight.

The exact nature of this invention as well as other objects and advantages thereof will be readily apparent from consideration of the following specification relating to the annexed drawing in which:

FIGURE 1 shows a side view taken partially in section of an embodiment of this invention; and FIGURE 2 shows a section view taken along line 2—2 of FIGURE 1.

Stated generally, the embodiment of the invention described herein provides two body portions, one being received within the other. A pair of mating opposed annular recesses contained in each of the body portions provides raceways in which bearing balls are disposed to accept thrust and radial loading of the connector and to permit ready swiveling action thereof. Additional annular recesses located on one of the body portions adjacent the raceway recesses thereof permit loading of the bearing balls into their respective recesses. A retaining ring mounted on one of the body portions maintains the relative assembled position of the two portions whereby the annular recesses are positioned to prevent any of the bearing balls from escaping their recesses.

More particularly and with respect to FIGURE 1, there is shown generally at 10 a swivel connector comprising a first body portion 11 and a second body portion 12. In their normally assembled positional relationship, body portion 11 contains a first annular bearing recess 13 in the form of a quarter-round recess having an open annular portion 14 substantially concentric with the major axis 15 of the connector. An annular recess 16 of substantially semi-circular cross section is disposed adjacent first bearing recess 13 so that open portion 14 adjoins the annular recess 16. A second annular bearing recess 17 is similarly provided on first body portion 11. Bearing recess 17, like bearing recess 13, is approximately quarter-round in cross section and has an annular open portion 21 adjoining an annular recess 22.

Second body portion 12 includes a shank portion 23 which is dimensioned to be received within first body portion 11 for assembly therewith. Shank portion 23 contains exteriorly thereof a first annular bearing recess 24 and a second annular bearing recess 25. Each of bearing recesses 24 and 25, which are substantially semicircular in cross section, is positioned around shank portion 23 so that when the first body portion 11 and second body portion 12 are in assembled relationship first bearing recess 24 is positioned in opposing relationship with first bearing recess 13 and second bearing recess 25 is in opposed relationship with second bearing recess 17. Thus, it is seen that bearing recesses 13 and 24 define a first bearing raceway in which is disposed a plurality of bearing balls 26. Bearing recesses 17 and 25 similarly define a second bearing raceway in which are disposed bearing balls 27. The relative dimensions of recesses 13, 24, 17 and 25, and of bearing balls 26 and 27 are such that in the embodiment shown, coextensive area 28 between the first and second body portions permits easy rotation or swiveling of the first body portion with respect to the second body portion.

Fluid sealing between the two body portions of the connector is accomplished by means of annular sealing member 31 which may, by way of example, take the form of the conventional O-ring. Sealing member 31 is received within annular recess 32, and a suitable backup ring 33 may be provided, if necessary, to prevent extrusion of sealing member 31.

Body portion 12 is retained against inward axial thrust with respect to body portion 11 by means of an annular retaining ring 34 disposed in annular groove 35 on the shank portion 23 of the second body portion 12 for abutment with surface 37. The purpose of retaining ring 34 will become more apparent in the light of the assembly explanation given below.

To assemble the swivel connection described above, sealing member 31 and backup ring 33 first are installed in recess 32 of body portion 11. Annnular retaining ring 34 then is disposed over shank portion 23 beyond annular groove 35 so that ring 34 temporarily rests around region 36 of shank portion 23. Body portions 11 and 12 then are positioned coaxially and vertically so that portion 11 is above portion 12 and shank portion 23 is disposed to enter body portion 11. Next, shank portion 23 is inserted into body portion 11 until outer end 40 of shank portion 23 is positioned in alignment with edge 41 formed by joinder of annular recess 22 with open portion 21. The plurality of bearing balls 27, which ultimately will be disposed in the bearing raceway formed by recesses 17 and 25, then is positioned in annular recess 22.

Shank portion 23 then is inserted further into body portion 11 until the outer end 40 is in alignment with the edge 42 formed by annular recess 16 and open portion 14. The plurality of bearing balls 26 then is disposed within annular recess 16. Further insertion of shank portion 23 aligns recess 24 with recess 16 and recess 25 with recess 17 so that the plurality of balls 26 contained in recess 16 can be received in recess 24 and the plurality of balls 27 contained in recess 22 can be received in recess 25. As the sleeve portion is withdrawn from the first body portion a short distance, the plurality of balls 26 becomes seated in its bearing raceway and prevents further withdrawal of the sleeve portion. Clearance 18 in recess 17 prevents plurality of balls 27 from accepting axial loading, as explained below. The final step in the assembly of this connector requires the moving of retaining ring 34 from its temporary position at region 36 of shank portion 23 into annular groove 35. As is apparent from the drawing, once this is done the retaining ring prevents second body portion 12 from moving inwardly with respect to first body portion 11 a sufficient amount to cause any of balls 26 and 27 to become dislodged from their respective raceways. An exemplary arrangement of bearing balls 26 in the raceway formed by recesses 13 and 24 is shown in detail in FIGURE 2.

Disassembly of the swivel connector is essentially the reverse of the assembly process detailed above. After retaining ring 34 has been removed from its annular groove 35 and disposed adjacent region 36, the shank portion 23 can be moved inwardly of first body portion 11 to cause alignment of recess 24 with recess 16 and concurrent alignment of recess 25 with recess 22. After the pluralities of balls 26 and 27 have become disposed in respective recesses 16 and 22, the second body portion 12 can be withdrawn from the first body portion 11. If necessary to permit the balls to become disposed in recesses 16 and 22, the connector may be positioned during disassembly with second body portion 12 uppermost.

Second bearing recess 17 includes an annular clearance 18 so that, when the connector is completely assembled, the line of action of force applied to and transmitted by bearing balls 27, as shown by line 19, is substantially radial to major connector axis 15. Bearing balls 26 are loaded with a force having both a radial component and an axial component to provide a resultant loading force acting, for example, along line 20. With such an arrangement, excessive wearing or failure of bearing balls 26 or their bearing raceway causes balls 27 to shift axially into clearance 18 so that axial loading of the connector is maintained.

Although the embodiment described above uses two bearing raceways and a single sealing member in a certain arrangement, this is only exemplary of a swivel joint connector according to this invention. For example, the sealing member 31 alternatively could be positioned between the raceways or to the left of the raceway receiving balls 26, the latter alternative serving to protect the balls from the effects of corrosive fluid flowing through the connector. Also, only one set of bearing balls, with the associated raceway and loading recess, need be provided. This one set would provide both axial and radial loading between the connector portion, with the other radial bearing function being provided by means of a suitable sleeve bearing at coextensive area 28.

From the foregoing, it can be seen that there has been described a swivel connector which has only two major components aside from bearing balls, seals and the like, and which is readily and quickly assembled. Furthermore, the body portions can be completely fabricated without the need for machining such additional features as transverse holes to permit the insertion and retention of the bearing balls. For example, the first and second body portions of this invention could be produced on an automatic screw machine from hexagonal stock, since all of the dimensions of each of these portions can be formed through turning operations.

Retaining ring 34 may be replaced with any device which, when the connector is assembled, functions to limit relative axial motion of the connector portions to a degree which will not permit any of the bearing balls to escape their respective raceways.

It should be understood, of course, that the foregoing disclosure relates to only a preferred embodiment of the invention and that numerous modifications or alterations may be made therein without departing from the spirit and the scope of the invention as set forth in the appended claims.

What is claimed is:
1. A swivel joint connector comprising:
a first member;
a second member;
said first member having a bore extending axially therein;
at least a portion of said second member being receivable within said bore for rotation therein;
a first annular recess extending around the periphery of said bore and defining a portion of a first bearing means receptacle;
a second annular recess extending around the periphery of said bore and defining a portion of a second bearing means receptacle, said second annular recess being spaced apart from said first annular recess along the axis of said bore;
a separate annular auxiliary recess associated with each of said first and second annular recesses, each of said auxiliary recesses being on that side of its associated annular recess remote from the side from which said portion of said second member enters said bore;
a third annular recess extending around the periphery of said portion of said second member and defining another portion of said first bearing means receptacle;
a fourth annular recess extending around the periphery of said portion of said second member and defining another portion of said second bearing means receptacle, the axial spacing between said third and fourth recesses being substantially equal to the axial spacing between said first and second recesses such that when said members are in assembled relationship said first and third recesses define said first bearing means receptacle and said second and fourth recesses define said second bearing means receptacle;
respective bearing means securing said first and second members in assembled position, each of said auxiliary recesses being configured to receive the bearing means when its associated recess is blocked from receiving the bearing means because of partial assembly of said members and to permit transfer of the bearing means from said auxiliary recess to a respective one of said third and fourth recesses when said members are positioned so that said third recess is in substantially opposed relationship with said auxiliary recess associated with said first recess and said fourth recess is in substantially opposed relationship with said auxiliary recess associated with said second recess; and
motion limiting means associated with said members to limit the relative axial movement of said members toward one another when said members are in completely assembled relationship.

2. A swivel joint connector comprising:
a first member;
a second member;
said first member having a bore extending axially therein;
at least a portion of said second member being receivable within said bore for rotation therein;
at least one annular recess extending around the periphery of said bore and defining a first portion of a bearing means receptacle, each said annular recess being integrally formed in the bore of said first member;
an annular recess extending around the periphery of said portion of the second member and defining a second portion of said bearing means receptacle, there being on said portion of the second member a said annular recess corresponding to each said annular recess in said bore;
an auxiliary recess contained in said bore and associated with each said annular recess in said bore, each said auxiliary recess being integrally formed in the bore of said first member;
said annular recess in said bore including an open portion coextensive with the innermost region of said annular recess and extending into adjoining relationship with the outermost portion of said auxiliary recess, bearing means securing said first and second members in assembled position;
said portion of the second member being dimensioned to be received within said bore beyond the normally assembled position with said annular recess on said portion of the second member being disposed in substantially opposed relationship with said annular recess in said bore to an intermediate assembly position with said annular recess on said portion of the second member being disposed in substantially opposed relationship with said auxiliary recess to permit said bearing means previously received in said auxiliary recess to be transferred to said annular recess in said portion of the second member so that return of said portion of the second member to said normally assembled position effects movement of the bearing means through said open region into the bearing means receptacle comprised by both annular recesses in substantially opposed relationship;
motion limiting means associated with said first and second members to limit the relative inward axial movement toward one another when assembled so that said annular recesses in said bore and on said portion of the second member are not substantially deviated from substantially opposed relationship;
said motion limiting means comprising an annular groove surrounding that part of said portion of the second member which is exterior of said bore when said first and second members are in said normally assembled position;
retaining means selectively receivable in said annular groove when said members are in normally assembled position; and
abutment means on said first member positioned to abut said retaining means to prevent inward axial movement of said second member with respect to said first member.

References Cited

UNITED STATES PATENTS

| 1,926,999 | 9/1933 | Keller | 308—196 X |
| 2,817,543 | 12/1957 | Corsette | 308—196 X |
| 2,944,840 | 7/1960 | Wiltse | 285—321 X |

FOREIGN PATENTS 916,256  1/1963  Great Britain.

CARL W. TOMLIN, *Primary Examiner.*

THOMAS F. CALLAGHAN, *Examiner.*